United States Patent [19]

Dreischhoff et al.

[11] Patent Number: 5,236,974
[45] Date of Patent: Aug. 17, 1993

[54] PROCESS FOR THE PREPARATION OF AQUEOUS EPOXY RESIN DISPERSIONS

[75] Inventors: Hans-Dieter Dreischhoff, Wiesbaden; Joerg-Peter Geisler, Ingelheim; Claus Godau, Kiedrich; Michael Hoenel, Wiesbaden, all of Fed. Rep. of Germany

[73] Assignee: Hoechst Aktiengesellschaft, Fed. Rep. of Germany

[21] Appl. No.: 935,581

[22] Filed: Aug. 26, 1992

[30] Foreign Application Priority Data

Aug. 28, 1991 [DE] Fed. Rep. of Germany ....... 4128487

[51] Int. Cl.$^5$ .............................................. C08L 63/02
[52] U.S. Cl. .................................... 523/403; 523/404; 525/524
[58] Field of Search ................ 525/524; 523/404, 403

[56] References Cited

U.S. PATENT DOCUMENTS

| 4,415,682 | 11/1983 | Becker et al. | 523/403 |
| 4,886,845 | 12/1989 | Becker et al. | 525/524 |

Primary Examiner—Melvyn I. Marquis
Assistant Examiner—D. Aylward
Attorney, Agent, or Firm—Bierman and Muserlian

[57] ABSTRACT

A process for the preparation of aqueous epoxy resin dispersions comprising (1) 20 to 75% by weight, based on the total dispersion, of an epoxy resin constituting a condensation product of
 a) epoxy compounds having at least one epoxy group per molecule and an epoxide equivalent weight of 90 to 3000 g/mol, and
 b) aromatic polyols;
(2) 3 to 20% by weight, based on the total dispersion, of an emulsifier comprising
 a) a condensation product of an aliphatic polyol and an epoxy compound having at least two epoxy groups per molecule and an epoxide equivalent weight of 90 to 3000 g/mol, the equivalent ratio of the OH groups to the epoxy groups being 1:0.85 to 1:1.5 and the epoxide equivalent weight of this condensation product being between 5000 and 400,000 g/mol,
 b) an organic solvent, and
 c) water;
(3) up to 10% by weight, based on the total dispersion, of organic solvents; and
(4) water in an amount to make up to 100% by weight, which comprises stirring the epoxy resin (1) firstly with the emulsifier (2) and, if appropriate, organic solvents corresponding to (3), and then with water.

12 Claims, No Drawings

PROCESS FOR THE PREPARATION OF AQUEOUS EPOXY RESIN DISPERSIONS

German Offenlegungsschrift 36 43 751 has already disclosed aqueous epoxy resin dispersions which are prepared in the presence of a condensation product of an aliphatic polyol and an epoxy compound as emulsifier. However, in addition to water, these aqueous dispersions always contain a certain amount of organic solvents. It has now been fond that this amount of solvent can be further reduced and also that particular properties relating to application technology can be further improved with this type of aqueous epoxy resin dispersions if, instead of preparing the epoxy resin in the presence of the emulsifier, as described in German Offenlegungsschrift 36 43 751, the epoxy resin is prepared on its own and the emulsifier is not added until the preparation of the epoxy resin has finished.

The invention thus relates to a process for the preparation of aqueous epoxy resin dispersions comprising (1) 20 to 75% by weight, based on the total dispersion, of an epoxy resin constituting a condensation product of
  a) 50 to 95, preferably 55 to 85% by weight of one or more epoxy compounds having an average of at least one, preferably at least two epoxy groups per molecule and an epoxide equivalent weight of 90 to 3000 g/mol, and
  b) 5 to 50, preferably 15 to 45% by weight of an aromatic polyol;

(2) 3 to 20, preferably 4 to 15% by weight, based on the total dispersion, of an emulsifier comprising
  a) 20 to 100, preferably 40 to 60% by weight of a condensation product of an aliphatic polyol having an average molecular weight (Mw) of 200 to 20,000 g/mol, and an epoxy compound having at least two epoxy groups per molecule and an epoxide equivalent weight of 90 to 3000 g/mol, the equivalent ratio of the OH groups to the epoxy groups being 1:0.85 to 1:1.5 and the epoxide equivalent weight of this condensation product being between 5000 and 400,000 g/mol,
  b) up to 50, preferably up to 30% by weight of an organic solvent, and
  c) up to 80, preferably 15 to 60% by weight of water;

(3) up to 10% by weight, based on the total dispersion, of organic solvents, including solvents corresponding to (2)b) which may be present; and (4) water in an amount to make up to 100% by weight.

This process comprises stirring the epoxy resin (1) firstly with the emulsifier (2) and, if appropriate, organic solvents corresponding to (3), and then with water.

The epoxy resin corresponding to (1) of the dispersions according to the invention preferably has an epoxide equivalent weight of 350 to 4000, especially of 400 to 3000 g/mol. The average particle size of the dispersed resin is generally not greater than 1.0 μm and is preferably 0.2 to 0.8 μm. The proportion of this resin in the total dispersion is 20 to 75% by weight, preferably about 25 to 65% by weight.

The 1,2-epoxy compounds corresponding to (1)a) and (2)a) are polyepoxides having an average of at least more than one, preferably at least two epoxy groups per molecule. These epoxy compounds can be either saturated or unsaturated and aliphatic, cycloaliphatic, aromatic and/or heterocyclic and can also contain hydroxyl groups. They can additionally contain substituents and/or functional groups which do not cause troublesome secondary reactions under the mixing or reaction conditions, for example alkyl or aryl substituents, ether groups and the like.

These epoxy compounds are preferably polyglycidyl ethers based on polyhydric, preferably dihydric alcohols, phenols, hydrogenation products of these phenols and/or novolaks (reaction products of monohydric or polyhydric phenols with aldehydes, especially formaldehyde, in the presence of acid catalysts). The epoxide equivalent weights of these epoxy compounds are preferably between 90 and 500, especially between 100 and 350 g/mol.

The following may be mentioned as examples of polyhydric phenols: resorcinol, hydroquinone, 2,2-bis(4-hydroxyphenyl)propane (bisphenol A), mixtures of isomers of dihydroxydiphenylmethane (bisphenol F), tetrabromobisphenol A, 4,4'-dihydroxydiphenylcyclohexane, 4,4'-dihydroxy-3,3'-dimethyldiphenylpropane, 4,4'-dihydroxybiphenyl, 4,4'-dihydroxybenzophenol, 1,1-bis(4-hydroxyphenyl)ethane, 2,2-bis[4-(2-hydroxypropoxy)phenyl]propane, 1,1-bis(4-hydroxyphenyl)isobutane, 2,2-bis(4-hydroxytert-butylphenyl)propane, bis(2-hydroxy naphthyl)methane, 1,5-dihydroxynaphthalene, tris(4-hydroxyphenyl)methane, bis(-4hydroxyphenyl)ether, bis(4-hydroxyphenyl) sulfone etc., as well as the halogenation and hydrogenation products of the abovementioned compounds. Bisphenol A is particularly preferred here.

Examples of polyhydric alcohols which may be mentioned are ethylene glycol, diethylene glycol, triethylene glycol, polyethylene glycols (n =1 to 35), propylene-1,2-glycol, polypropylene glycols (n =1 to 15), propylene-1,3-glycol, butane-1,4-diol, pentane-1,5-diol, hexane-1,6-diol, hexane-1,2,6-triol, glycerol, neopentane glycol, cyclohexanedimethanol, trimethylolethane, trimethylolpropane and reaction products of aliphatic or aromatic polyols, for example trimethylol propane or bisphenol A, with ethylene oxide and/or propylene oxide. Polypropylene glycols (n=8–10), cyclohexanedimethanol and reaction products of bisphenol A with propylene oxide are particularly preferred here.

It is also possible to use polyglycidyl esters of polycarboxylic acids, which are obtained by reacting epichlorohydrin or similar epoxy compounds with an aliphatic, cycloaliphatic or aromatic polycarboxylic acid such as oxalic acid, succinic acid, adipic acid, glutaric acid, phthalic acid, terephthalic acid, hexahydrophthalic acid, naphthalene-2,6-dicarboxylic acid and dimerized linolenic acid. Examples are diglycidyl adipate, diglycidyl phthalate and diglycidyl hexahydrophthalate.

An extensive list of suitable epoxy compounds can be found in the handbook "Epoxidverbindungen und Epoxidharze" ("Epoxy Compounds and Epoxy Resins") by A. M. Paquin, Springer Verlag, Berlin 1958, Chapter IV, and in Lee, Neville, "Handbook of Epoxy Resins", McGraw-Hill Book Co., 1967, Chapter 2. Said epoxy compounds can be used individually or in a mixture.

Possible aromatic polyols corresponding to (1)b) are preferably the aromatic compounds containing OH groups which were described above for components (1)a) and (2)a), i.e. polyhydric, preferably dihydric phenols, halogenation products thereof and/or novolaks. Bisphenol A is again particularly preferred here.

The aliphatic polyols of component (2)a are preferably polyetherpolyols (polyalkylene glycols) preferably having average molecular weights (Mw; gel permeation chromatography; polystyrene standard) of between 600 and 12,000, especially of 2000 to 8000, and conveniently having OH numbers of 10 to 600, preferably 15 to 120. These polyetherpolyols preferably contain only terminal primary OH groups. Examples which may be mentioned here are block copolymers of ethylene oxide and propylene oxide as well as polyethylene, polypropylene and polybutylene glycols, it also being possible to use mixtures of the respective polyalkylene glycols. It is preferable to use polyethylene glycols.

The dispersant (2)a is preferably prepared by condensing said polyetherpolyols with the polyglycidyl ethers in the presence of suitable catalysts at 50° to 200° C., preferably at 90° to 170° C., the equivalent ratio of the OH groups to the epoxy groups being 1:0.85 to 1:1.5, preferably 1:0.95 to 1:1.25, and the epoxide equivalent weight of the condensation product being at least 5000 g/mol, preferably 100,000 g/mol to 400,000 g/mol.

Suitable catalysts for the preparation of the dispersant (2)a are strong inorganic and organic bases, for example sodium hydroxide, potassium hydroxide, lithium hydroxide, barium hydroxide, strontium hydroxide and alkali metal alcoholates such as sodium methylate, lithium methylate, sodium ethylate and potassium dodecylate, and the alkali metal salts of carboxylic acids, for example sodium and lithium stearate. Other suitable catalysts are strong inorganic and organic protonic acids, for example phosphoric acid, sulfuric acid, tetrafluoroboric acid and benzenesulfonic acid. Lewis acids can also be used as catalysts. Examples which may be mentioned are tin(IV) tetrachloride, titanium(IV) tetrachloride, titanium(IV) tetraisopropylate, triethyloxonium tetrafluoroborate and boron trifluoride and its complexes, for example with phosphoric acid, acetic acid (1:1 and 1:2), methanol, diethyl ether, tetrahydrofuran, phenol, ethylene glycol monoethyl ether, polyethylene glycol (MW 200), dimethyl sulfoxide, di-n-butyl ether, di-n-hexyl ether, succinic acid, aliphatic, cycloaliphatic and araliphatic amines and nitrogen heterocycles.

$BF_3$-diethyl ether, $BF_3$-acetic acid and aqueous tetrafluoroboric acid are preferably used as catalysts. The amount of catalyst is generally 0.1 to 5, preferably 0.1 to 1% by weight, based on the reaction mixture. The dosing can be improved by diluting the catalyst in a solvent such as diethyl ether, a glycol ether, a cyclic ether, a ketone or the like.

To prepare the dispersant, the mixtures to be reacted, composed of compounds containing hydroxyl groups and epoxy groups, are heated to the temperature at which the condensation proceeds at a sufficient rate, i.e. in 30 min to 5 hours. The reaction is conveniently followed via the increase in the epoxide equivalent, which indicates a decrease in the epoxy groups. The reaction can be terminated by cooling below the reaction temperature.

The condensation product (2)a obtained in this way can be used as such (100%) as dispersant (2) for the preparation of the epoxy resin dispersions. However, for reasons of easier handling, it is preferable to prepare a mixture of 20 to 99, preferably 40 to 60% of the condensation product (2)a and an aqueous medium composed of up to 50, preferably up to 30% of an organic solvent (2)b and 1 to 80%, preferably 15 to 60% of water (2)c (based on the total mixture) and to use this mixture as emulsifier (2). Possible organic solvents corresponding to component (2)b are especially glycols, mono- and di-ethers and -esters of glycols with alcohols and acids, aliphatic alcohols with branched or unbranched alkyl radicals having 1 to 12 carbon atoms, cycloaliphatic and araliphatic alcohols, esters and ketones, it being possible for these solvents to be used individually or in a mixture. Examples which may be mentioned are ethylene glycol, ethylene glycol monomethyl ether, ethylene glycol dimethyl ether, diethylene glycol dimethyl ether, propylene glycol, propylene glycol monomethyl ether, propylene glycol dimethyl ether, butyl glycol, butyl diglycol, methoxypropanol, ethoxypropanol, ethanol, propan-1-ol and -2-ol, butanol, cyclohexanol, diacetone alcohol, benzyl alcohol, ethyl acetate, acetone and methyl isobutyl ketone. It is preferable to use butyl glycol, methoxypropanol, ethoxypropanol, propan-2-ol and/or benzyl alcohol.

The epoxy resin dispersions preferably contain 4 to 15% by weight of the emulsifier (2).

Possible organic solvents corresponding to component (3) also include the above-mentioned solvents corresponding to (2)b), as well as less water-miscible and/or water-insoluble solvents. Examples which may be mentioned are aromatics such as toluene or xylene, ketones such as methoxyhexanone or cyclohexanone, and esters such as ethyl 3-ethoxypropionate. The solvents can be used individually or in a mixture. Preferred solvents are again butyl glycol, methoxypropanol, ethoxypropanol, propan-2-ol and/or benzyl alcohol.

The total content of organic solvents in the dispersion, calculated as the sum of the amounts of solvents (2)b) and (3), is up to 10% by weight, preferably less than 6% by weight, based on the total dispersion.

Examples which may be mentioned of conventional additives which may be present in the combinations according to the invention are the conventional paint additives such as pigments, pigment pastes, antioxidants, leveling agents and/or thickeners, antifoams and/or wetting agents, reactive thinners, fillers, catalysts, preservatives, protective colloids and the like. It is possible for these additives, like the hardeners and other hardenable resins described below, only to be added to the dispersion immediately before processing, if appropriate.

Hardeners which can be used for the epoxy resins of the invention are the hardeners and/or hardening compounds (epoxy hardeners) known for this purpose, such as basic hardeners (amine hardeners), for example polyamines, Mannich bases and adducts of amines on to polymers such as polyepoxides and polyamidoamines.

It is also possible to use acid hardeners such as polycarboxylic acids and their anhydrides, as well as polyhydric phenols. Synthetic resins containing hydroxyl and/or amino groups, such as amino or phenolic resins, are also suitable for this purpose.

The epoxy resin dispersions according to the invention can alternatively be hardened by means of so-called latent hardeners, i.e. compounds which only develop their crosslinking action towards epoxy compounds at elevated temperature, for example at 60° to 250° C. Examples of such hardeners are urea, dicyandiamide, imidazole, guanidine, hydrazide and derivatives of said compounds. Of these latent hardeners, it is preferable to use dicyandiamide.

Examples of basic hardeners, preferably for hardening at room temperature and/or lower temperatures (amine cold hardeners), which are generally used in an equivalent ratio epoxide equivalent to amino hydrogen equivalent of 1 to (0.75 to 2.0), are polyalkyleneamines such as diethylenetriamine, triethylenetetramine, tetra ethylenepentamine, pentaethylenehexamine etc., also 2,2,4- and/or 2,4,4-trimethylhexamethylenediamine, bis(3-aminopropyl)amine, 1,4-bis(3-aminopropyl)piperazine, N,N-bis(3-aminopropyl)ethylenediamine,neopentanediamine,2-methylpentane-1,5-diamine,1,3-diaminopentane,hexamethylenediamine etc., and cycloaliphatic amines such as 1,2- and/or 1,3-diaminocyclohexane, 1,4-diamino-3,6-diethylcyclohexane, 1,2-diamino-4-ethylcyclohexane, 1-cyclohexyl-3,4-diaminocyclohexane, isophoronediamine and reaction products thereof, 4,4'-diaminodicyclohexyl-methane and -propane, 2,2-bis(4-aminocyclohexyl)-methane and -propane,3,3,-dimethyl-4,4'-diaminodicyclohexylmethane, 3-amino-1-cyclohexylaminopropane and 1,3- and 1,4-bis(aminomethyl)cyclohexane.

Araliphatic amines used are especially those in which aliphatic amino groups are present, e.g. meta- and para-xylylenediamine or hydrogenation products thereof.

Said amines can be used on their own or as mixtures.

Suitable Mannich bases are prepared by condensing polyamines, preferably diethylenetriamine, triethylene tetramine, isophoronediamine, 2,2,4- and/or 2,4,4-trimethylhexamethylenediamine and 1,3- and 1,4-bis-(aminomethyl)cyclohexane, and especially meta- and para-xylylenediamine, with aldehydes, preferably formaldehyde, and with monohydric or polyhydric phenols having at least one ring position reactive towards aldehydes, for example the various cresols and xylenols, paratert- butylphenol, resorcinol, 4,4'-dihydroxydiphenylmethane and2,2-(4,4'-dihydroxydiphenyl)propane, but preferably phenol or nonylphenol.

Examples of possible amine/epoxide adducts are reaction products of polyamines, e.g. ethylenediamine, propylenediamine, hexamethylenediamine, 2,2,4- and 2,4,4-trimethylhexamethylenediamine, metaxylylenediamine and/or bis(aminomethyl)cyclohexane, with terminal mono- or poly-epoxides, e.g. propylene oxide, hexene oxide and cyclohexene oxide, or with glycidyl ethers such as phenyl glycidyl ether, tert-butyl glycidyl ether, ethylhexyl glycidyl ether and butyl glycidyl ether, or with glycidyl esters such as the glycidyl ester of versatic acid, Cardura E, marketed by Shell, or with the polyglycidyl ethers and esters mentioned under (1)a) and/or (1)b).

Polyamidoamines which can be used for hardening the epoxy resin dispersions according to the invention are obtained for example by reacting polyamines with mono- or polycarboxylic acids, e.g. dimerized fatty acids.

Amine hardeners which are preferably used, in addition to the above-mentioned polyamines, are water-soluble polyoxyalkylene-diamines and -polyamines with molecular weights of 100 to 2000, e.g. the products marketed by Texaco under the trademark Jeffamines, and readily water-dispersible hardeners such as those described in German Auslegeschrift 23 32 177 and European patent 0 000 605, e.g. modified amine adducts.

To achieve a more rapid and/or more complete through-hardening, the coatings obtainable from the epoxy resin dispersions according to the invention with said amine hardeners can be heated at 50° to 120° C. for 15 to 120 minutes.

Suitable acid hardeners, which are generally used in an equivalent ratio epoxide equivalent to carboxyl equivalent of 1 to (0.75 to 2), are water-soluble or water-miscible polycarboxylic acids. Examples of such polycarboxylic acids are cyclopentanetetracarboxylic acid, cyclobutanetetracarboxylic acid, butane-1,2,3,4-tetracarboxylic acid, tartaric acid, malonic acid, malic acid, citric acid, aconitic acid etc. Other suitable acid hardeners are, if appropriate, anhydrides or acidic esters of these acids with polyhydric alcohols having 2 to 12, preferably 2 to 6 carbon atoms, for example neopentyl glycol, glycerol, trimethylolethane or -propane, alkanediols and oligomers thereof which may contain one or more ether bridges, such as ethylene glycol, propanediol and butanediol, the esters always having at least two free carboxyl groups. It is also possible to use as polycarboxylic acid hardeners acidic esters, containing two or more carboxyl groups, of carboxylic acids, for example pyromellitic acid, trimellitic acid, phthalic acid, endomethylenetetrarahydrophthalic acid or endomethylenehexahydrophthalic acid, maleic acid, fumaric acid and/or anhydrides thereof, where such anhydrides exist, with polyhydric alcohols, e.g. those mentioned above, provided that these acidic esters have an adequate solubility and/or dilutability in water. Polycarboxylic acids are preferably used as acid hardeners.

The hardening of the epoxy resin dispersions with said acid hardeners conveniently takes place at elevated temperatures, e.g. at 60° to 220° C., preferably at 80° to 200° C., in 15 to 150 minutes. To achieve a more complete through-hardening and/or to lower the temperatures required for an adequate through-hardening, small amounts of compounds can also be added to said acid hardeners to catalyze the carboxyl group/epoxy group reaction. Examples of suitable compounds are strong protonic acids such as phosphoric acid or paratoluene sulfonic acid, tertiary amines such as triethylamine or N,N-dimethylbenzylamine, nitrogen heterocycles such as imidazole, pyridine and derivatives thereof, trialkyl- and triaryl-phosphines and corresponding phosphonium compounds, and metal salts and/or chelates, for example tin(II) octoate.

Instead of or in addition to the hardeners described above, amino and/or phenolic resins can also be used for hardening in amounts of 5 to 50% by weight, preferably 10 to 35% by weight, based on the total solids content. If appropriate, the dispersion is adjusted here to a total solids content of 10 to 80% by weight by the addition of water. Examples of such amino resins are aminoaldehyde resins, i.e. condensation products of aldehydes with melamine (melamine resins), urea (urea resins), acetoguanamine (acetoguanamine resins) or similar compounds, and/or corresponding precondensation products. Preferred aldehyde condensation products of melamine are in particular the melaminemethylol alkyl ethers, the alkyl radicals being methyl or n- or i-butyl groups, preferably methyl groups, such as hexamethoxymethylmelamine, ethoxy methoxymethylmelamine, monomethylolpentamethoxymethyl melamine, dimethyloltetramethoxymethylenemelamine, trimethyloltrimethoxymethylenemelamine and the like with a substantially monomeric structure, and corresponding oligomeric or polymeric products.

Phenolic resin hardeners which may be mentioned are resols, formaldehyde/phenolcarboxylic acid resins and phenolic resin precursors, the commercially available etherified, water-dilutable phenolic resin resols being preferred.

If necessary, acid catalysts, such as paratoluenesulfonic acid, cyclohexanesulfamic acid, acidic butyl phosphate and phosphoric acid—also as (amine) salts, if appropriate—can also be added to the dispersions containing phenolic and/or amino resin in order to accelerate the hardening reaction, so as to produce films or coatings which harden at low temperature or in a shorter time. The amount of these acid catalysts is e.g. 2% by weight, based on the total solids content.

Examples of additional hardenable resins are resins dispersible in aqueous media and based on hydroxyalkyl acrylic acid ester, hydroxyalkyds, polyesters, epoxy resins and the like. The proportion of these additional resins can be calculated for example so that the total solids content of the mixture is about 10 to 80, preferably 20 to 40% by weight. The properties of the products prepared from the dispersions can be influenced in a variety of ways by the addition of such resins. Thus it is possible e.g. to increase the yellowing resistance by the addition of acrylate resins, while the presence of alkyd resins markedly improves the elasticity of the coatings prepared from the dispersions.

The total solids content of the epoxy resin dispersions according to the invention can be between 10 and 80% by weight; it is conveniently between 35 and 70% by weight and preferably between 45 and 65% by weight. The water content is preferably 20 to 80, especially 30 to 60% by weight.

The viscosity of these dispersions is generally between 200 and 30,000 mPa.s, preferably between 750 and 7000 mPa.s.

The epoxy resin dispersions prepared by the process according to the invention are distinguished on the one hand by their good storage stability, which is attributable to the small average particle size for secondary dispersions, and on the other hand especially by their very low or zero content of organic solvents. Moreover, compared with already known epoxy resin dispersions, the coatings produced with dispersions prepared by the process according to the invention have a number of technological advantages, e.g. very low sensitivity to water, very good elasticity coupled with improved hardness, good to very good adhesion to a wide variety of substrates, outstanding anticorrosive action when coated onto metallic materials, etc.

To prepare the epoxy resin dispersions by the process according to the invention, the epoxy resin (1) is first prepared by condensing components (1)a and (1)b at elevated temperatures, generally at 100° to 220° C., preferably at 150° to 180° C., in the presence of a catalyst for accelerating the condensation reaction.

If two or more epoxy compounds (1)a are used, the condensation reaction is preferably carried out in two stages in such a way that, in a first reaction, one or more components (1)a are reacted with the components corresponding to (1)b in proportions such that this first condensation product has an epoxide equivalent weight of more than 5000 g/mol, preferably of more than 20,000 g/mol, and still contains free phenolic groups, and, in a further condensation reaction, this first condensation product is reacted with other epoxy compounds corresponding to (1)a so as finally to give the desired epoxy resin (1).

Examples of suitable condensation catalysts are phosphines such as triphenylphosphine, phosphonium salts such as benzyltrimethylphosphonium chloride, tertiary amines such as N,N-dimethylbenzylamine, quaternary ammonium salts such as tetramethylammonium chloride, alkali metal hydroxides such as sodium hydroxide and lithium hydroxide, alkali metal carbonates such as sodium carbonate and lithium carbonate, alkali metal salts of organic acids, such as sodium formate, lithium benzoate and lithium stearate, and Lewis acids such as boron trifluoride and its complexes, titanium tetrachloride, tin chloride and triethyloxonium tetrafluoroborate.

Then the dispersant (2) and, if appropriate, organic solvents corresponding to (3) are added to the epoxy resin (1) and the mixture is stirred for some time, preferably for 15 to 180, especially 30 to 90 minutes. The dispersant is preferably added at elevated temperature, for example at 60° to 200° C., preferably 70° to 120° C.

The appropriate amount of water (4) is then metered in, preferably in several portions, with vigorous stirring, to form the aqueous dispersion. The water is preferably added at elevated temperatures as well, for example at 30 to 100° C., preferably at 50° to 90° C.

The epoxy resin (1) is conveniently dispersed in water with suitable dispersing apparatuses, for example with a high-speed vane-type stirrer, a pulsation helical ribbon impeller, a colloid mill, a homogenizer, a dissolver or some other type of high-speed mixer with a high shearing force.

Preferably, the hardeners and other hardenable resins are only added to the dispersion immediately before use.

On account of their outstanding technological properties already described, for example in respect of adhesion, hardness, anticorrosive action, resistance to water and chemicals, etc., the dispersions as obtained by the process according to the invention, in combination with suitable hardeners and additives, are suitable for the preparation of coatings, undercoats, painting materials, molding compounds and hardenable compounds for a wide variety of fields of application. For example, they can be used for the preparation of protective and/or decorative coatings on a wide variety of substrates, especially rough and porous substrates, e.g. wood, mineral substrates (e.g. concrete and stone), glass, plastics (e.g. polyethylene, polypropylene etc.), composite materials, ceramic and pretreated or non-pretreated metals. Their favorable properties also make the dispersions according to the invention outstandingly suitable for one-coat painting. The adhesive top coat can remain as such, unmodified, but it can also serve as an undercoat, i.e. as a substrate for further coats, which in turn can comprise the same coating material or another conventional coating material.

A further possibility is to use the dispersions for the preparation of water-dilutable adhesives. They can also be used as binders for textile, organic and/or inorganic materials and as additives for plastic cements.

If the dispersion is used as a coating agent or as a predominantly water-based paint, it is applied to the substrate by conventional methods such as coating, spraying, dipping or rolling. Provided that hardeners for cold hardening are not incorporated, the coatings are hardened by heating at 80° to 250° C. for a sufficient time to allow hardening, generally for 5 to 60 minutes.

EXAMPLES

I. Preparation of the Emulsifiers (2)

1) 309 g of technical-grade polyethylene glycol with an average molecular weight (Mw) of 4000 g/mol and 34.1 g of a polyglycidyl ether based on bisphenol A with an epoxide equivalent weight of 183 g/mol were heated together to 100° C. and 0.35 ml of 50% aqueous tetrafluoroboric acid was added, with stirring. The equivalent ratio of OH groups to epoxy groups was 1:1.20. The mixture was heated further to 130° C. and held at this temperature until the epoxide equivalent weight of the condensation product was approx. 350,000 g/mol. After cooling, the emulsifier had a brittle, waxy, solid consistency.

2) 250 g of the condensation product prepared according to Example I.1) were dissolved in 250 g of water, with stirring and gentle heating to approx. 80° C. The clear, pale yellow emulsifier solution obtained had a viscosity (measured with an Ubbelohde viscometer, 25° C.) of 3500 mPa.s and a solids content of 50%.

3) 250 g of the condensation product prepared according to Example I.1) were dissolved in a mixture of 125 g of water and 125 g of propan-2-ol, with stirring and gentle heating to approx. 70° C. The clear, slightly yellowish emulsifier solution obtained had a viscosity (measured with an Ubbelohde viscometer, 25° C) of 2300 mPa.s and a solids content of 50%.

II. Preparation of the Dispersions According to the Invention

1) In a 1 l four-necked flask equipped with a thermometer, a vane-type stirrer, a reflux condenser and a dropping funnel, 58 g of a polypropylene glycol diglycidyl ether with an epoxide equivalent weight of 330 g/mol and 91 g of bisphenol A were heated to 130° C. in a nitrogen inert gas atmosphere, with stirring. After the addition of 170 mg of catalyst 1201 from Shell Chemie, the mixture was heated further to 160° C. and held at this temperature until the epoxide equivalent weight of the reaction product was more than 100,000 g/mol. It was then cooled to 120° C. and 288 g of a polyglycidyl ether based on bisphenol A with an epoxide equivalent weight of 183 g/mol were added at this temperature. After the addition of a further 200 mg of catalyst 1201, the mixture was heated to 160° C. and held at this temperature until the product had an epoxide equivalent weight of 460 g/mol. The reaction mixture was then cooled to 120° C., 37 g of the emulsifier prepared according to Example I.1) were added, with stirring, and the temperature was allowed to drop to 85° C. over 1.5 hours. At a stirrer speed of approx. 600 rpm, 150 g of deionized water were metered in uniformly over a period of 15 minutes and the mixture was then stirred for 60 minutes while the temperature dropped to 70° C. The aqueous dispersion formed was subsequently diluted with 260 g of deionized water. The dispersion had a solids content of 52.8% by weight, a viscosity of 4400 mPa.s (measured with a Brookfield viscometer, no. 3 spindle, 12 rpm, 25° C.) and an average particle size of 579 nm (photon correlation spectroscopy (PCS), monomodal evaluation).

2) In a 1 l four-necked flask equipped with a thermometer, a vane-type stirrer, a reflux condenser and a dropping funnel, 58 g of a polypropylene glycol diglycidyl ether with an epoxide equivalent weight of 330 g/mol and 91 g of bisphenol A were heated to 130° C. in a nitrogen inert gas atmosphere, with stirring. After the addition of 150 mg of catalyst 1201 from Shell Chemie, the mixture was heated further to 155 to 160° C. and held at this temperature until the reaction product had an epoxide equivalent weight of more than 100,000 g/mol. It was then cooled to 120° to 130° C. and 288 g of a polyglycidyl ether based on bisphenol A with an epoxide equivalent weight of 183 g/mol and a further 200 mg of the catalyst were added. The temperature was then raised to 160° C. and the mixture was stirred until the product had an epoxide equivalent weight of 460 to 470 g/mol. After cooling to 90° to 95° C., 76 g of the emulsifier prepared according to Example I.2) were added and the mixture was stirred for approx. 1.5 hours while the temperature was allowed to drop to 80° to 85° C. At a stirrer speed of approx. 600 rpm, 85 g of deionized water were metered in over a period of 15 minutes and the mixture was stirred at 65° to 75° C. After 90 minutes, a further 165 g of deionized water were metered in and the mixture was stirred for 60 minutes. Finally the aqueous, solvent-free dispersion formed was diluted with a further 75 g of deionized water, and 900 mg of the preservative Mergal K 9 N from Riedel-de Haen were added. . The dispersion had a solids content of 55.9% by weight, a viscosity of 800 mPa.s (Brookfield viscometer, no. 3 spindle, 30 rpm, 25° C.) and an average particle size of 559 nm (PCS, monomodal evaluation).

3) In a 1 l four-necked flask equipped with a thermo meter, a vane-type stirrer, a reflux condenser and a dropping funnel, 59 g of a polypropylene glycol diglycidyl ether with an epoxide equivalent weight of 330 g/mol and 91 g of bisphenol A were heated to 120 to 125° C. in a nitrogen inert gas atmosphere, with stirring, and 170 mg of catalyst 1201 from Shell Chemie were then added. The reaction mixture was then heated to 150° to 160° C. and held at this temperature until the epoxide equivalent weight of the product was greater than 100,000 g/mol. After cooling to 120° to 130° C., 288 g of a polyglycidyl ether based on bisphenol A with an epoxide equivalent weight of 183 g/mol and a further 150 mg of the catalyst were added and the mixture was again heated to 150° to 160° C. It was held at this temperature until the condensation product had an epoxide equivalent of 460 to 470 g/mol, and then cooled to 95° C. 76 g of the emulsifier prepared according to Example I.3) were then added, with thorough stirring, and the mixture was stirred for 60 minutes while the temperature dropped to 75 to 80° C. At a stirrer speed of approx. 600 rpm, 70 g of deionized water were then metered in uniformly over 15 minutes and the mixture was stirred for 45 minutes. A further 90 g of deionized water were then metered in at 65° C. and the mixture was stirred for 60 minutes. Finally the aqueous dispersion formed was diluted with a further 190 g of deionized water, and 900 mg of Mergal K 9 N from Riedel-de Haen were added. The finished dispersion had a solids content of 52.4% by weight, a viscosity of 2300 mPa.s (Brookfield viscometer, no. 3 spindle, 12 rpm, 25° C) and an average particle size of 298 nm (PCS, monomodal evaluation).

4) In a 1 l four-necked flask equipped with a thermometer, a vane-type stirrer, a reflux condenser and a dropping funnel, 37 g of a polypropylene glycol diglycidyl ether with an epoxide equivalent weight of 330 g/mol, 11 g of bisphenol A and 109 g of tetrabromobisphenol A were heated to 120° C. under nitrogen as an inert gas, with stirring. After the addition of 100 mg of catalyst 1201 from Shell Chemie, the mixture was heated further to 160° C. and held at this temperature until the epoxide equivalent weight of the reaction product was more than 60,000 g/mol. It was then cooled to 120° C., 182 g of a polyglycidyl ether based on bisphenol A with an epoxide equivalent weight of 183 g/mol and a further 130 mg of the catalyst were added and the mixture was again heated to 160 to 170° C. When the condensation product had an epoxide equivalent of 590 g/mol, it was cooled and 76 g of the emulsifier according to Example I.3) were added at a temperature of 90° C. The emulsifier was stirred for 60 minutes with further cooling to 75° C., 54 g of deionized water were then metered in at a stirrer speed of 600 rpm and the mixture was stirred for 90 minutes. This was followed by the addition of a further 73 g of deionized water and the mixture was stirred at 50° to 60° C. for 90 minutes. Finally the aqueous dispersion was diluted with a further 144 g of deionized water. The dispersion had a solids content of 55% by weight, a viscosity of 1700 mPa.s (Brookfield viscometer, no. 2 spindle, 12 rpm, 25° C.) and an average particle size of 790 nm (PCS, monomodal evaluation).

5) In a 1 l four-necked flask equipped with a dropping funnel, a vane-type stirrer, a reflux condenser and a thermometer, 81 g of bisphenol A and 48 g of a polypropylene glycol diglycidyl ether with an epoxide equivalent weight of 330 g/mol were heated to 120 to 130° C. in a nitrogen inert gas atmosphere, with stirring. After the addition of 400 mg of triphenylphosphine, the mixture was heated further to 160° to 170° C. and held at this temperature until the epoxide equivalent weight of the condensation product was more than 70,000 g/mol. It was then cooled to 120° C., 172 g of a polyglycidyl ether based on bisphenol A with an epoxide equivalent weight of 183 g/mol were added and the mixture was then heated again to 160° to 170° C. until the product had an epoxide equivalent weight of 795 g/mol. When the reaction mixture had been cooled to 90° to 95° C., 67 g of the emulsifier prepared according to Example I.2) were added and the mixture was stirred thoroughly for 90 minutes, the temperature dropping to 75° to 80° C. 80 g of deionized water were then metered in at a stirrer speed of approx. 600 rpm and the mixture was stirred for 70 minutes. When the temperature had dropped to 65° to 70° C., a further 120 g of deionized water were metered in and the mixture was stirred for 60 minutes. Finally the aqueous, solvent-free dispersion was diluted with a further 40 g of deionized water, and 800 mg of Mergal K 9 N from Riedel-de Haen (preservative) were added. The dispersion had a solids content of 54.8% by weight, a viscosity of 400 mPa.s (Brookfield viscometer, no. 2 spindle, 12 rpm, 25° C.) and an average particle size of 731 nm (PCS, monomodal evaluation).

6) In a 1 l four-necked flask equipped with a thermometer, a vane-type stirrer, a reflux condenser and a dropping funnel, 59 g of a polypropylene glycol diglycidyl ether with an epoxide equivalent weight of 330 g/mol and 91 g of bisphenol A were heated to 125° C. under nitrogen, with stirring, and 160 mg of catalyst 1201 from Shell Chemie were then added. The mixture was subsequently heated to 160° C. and held at this temperature until the epoxide equivalent weight of the product was greater than 100,000 g/mol. After cooling to 120° to 130° C., 288 g of a polyglycidyl ether based on bisphenol A with an epoxide equivalent weight of 183 g/mol and a further 150 mg of the catalyst were added and the mixture was heated again to 150° to 160° C. It was held at this temperature until the reaction product had an epoxide equivalent of 460 to 470 g/mol, and then cooled to 100° C. 24 g of xylene were then added and the mixture was stirred for one hour. 94 g of the emulsifier prepared according to Example I.3) were then added, with thorough stirring, and the mixture was stirred for 60 minutes, the temperature being allowed to drop to 75° to 80° C. At a stirrer speed of approx. 600 rpm, 88 g of deionized water were then metered in uniformly over 15 minutes and the mixture was stirred for 45 minutes. A further 85 g of deionized water were then metered in at 65° C. and the mixture was stirred for 60 minutes. Finally the aqueous dispersion formed was diluted with a further 276 g of deionized water. The finished dispersion had a solids content of 48.3% by weight, a viscosity of 1100 mPa.s (Brookfield viscometer, no. 3 spindle, 12 rpm, 25° C.) and an average particle size of 294 nm (PCS, monomodal evaluation).

7) In a 1 l four-necked flask equipped with a thermometer, a vane-type stirrer, a reflux condenser and a dropping funnel, 58 g of a polypropylene glycol diglycidyl ether with an epoxide equivalent weight of 330 g/mol and 93.5 g of bisphenol A were heated to 120° C. under nitrogen as an inert gas, with stirring. After the addition of 150 mg of catalyst 1201 from Shell Chemie, the mixture was heated further to 160° C. and held at this temperature until the epoxide equivalent weight of the reaction product was greater than 78,000 g/mol. It was then cooled to 120° C., 142 g of a polyglycidyl ether based on bisphenol A with an epoxide equivalent weight of 183 g/mol, 142.5 g of Eurepox ® RV-C from Schering AG (diglycidyl ether of cyclohexanedimethanol, epoxide equivalent weight 174 g/mol) and a further 200 mg of the catalyst were added and the mixture was heated again to 160° to 170° C. When the condensation product had an epoxide equivalent of 460 g/mol, the mixture was cooled and 71 g of the emulsifier according to Example I.3) were added at a temperature of 75° C. The emulsifier was stirred for 60 minutes with further cooling to 75° C., 110 g of deionized water were then metered in at a stirrer speed of 600 rpm and the mixture was stirred for 90 minutes. This was followed by the addition of a further 75 g of deionized water and the mixture was stirred for 90 minutes at 50° to 60° C. The aqueous dispersion was finally diluted with a further 155 g of deionized water. The dispersion had a solids content of 54.0% by weight, a viscosity of 1950 mPa.s (Brookfield viscometer, no. 2 spindle, 12 rpm, 25° C.) and an average particle size of 506 nm (PCS, monomodal evaluation).

8) In a 1 l four-necked flask equipped with a dropping funnel, a vane-type stirrer, a reflux condenser and a thermometer, 61 g of bisphenol A and 58 g of a polypropylene glycol diglycidyl ether with an epoxide equivalent weight of 330 g/mol were heated to 120 to 130° C. under nitrogen, with stirring. After the addition of 150 mg of catalyst 1201 from Shell Chemie, the mixture was heated further to 160° to 165° C. and held at this temperature until the epoxide equivalent weight of the condensation product was more than 60,000 g/mol. It was then cooled to 120° C., 158.5 g of a polyglycidyl ether based on bisphenol A (epoxide equivalent weight 183 g/mol), 158.5 g of the epoxy resin XU 71891.00 from DOW Deutschland Inc. (diglycidyl ether of a reaction product of bisphenol A and propylene oxide, epoxide equivalent weight 340 g/mol) and 200 mg of said catalyst were added and the mixture was then heated again to 160° to 165° C. until the product had an epoxide equivalent weight of 450 g/mol. When the reaction mixture had been cooled to 90° to 95° C., 76 g of the emulsifier prepared according to Example I.2) were added and the mixture was stirred thoroughly for 90 minutes, the temperature dropping to 80° to 85° C. 65 g of deionized water were then metered in at a stirrer speed of approx. 600 rpm and the mixture was stirred for 60 minutes. Finally the aqueous, solvent-free dispersion was diluted with a further 185 g of deionized water, and 860 g of Mergal K 9 N from Riedel-de Haen (preservative) were added. The dispersion had a solids content of 53.8% by weight, a viscosity of 1200 mPa.s (Brookfield viscometer, no. 2 spindle, 12 rpm, 25° C.) and an average particle size of 359 nm (PCS, monomodal evaluation).

III. Application Technology Tests

Dispersions according to the invention (Examples II.3 II.8 and II.9) and a dispersion according to the state of the art (German patent 36 43 751) were subjected to some application technology tests, the results of which are collated in the two Tables below:

TABLE 1

|  | Dispersions according to the invention | |
| --- | --- | --- |
|  | Example II.3 | Example II.7 |
| Dispersion | 100 parts | 100 parts |
| Hardener according to European patent 0 000 605; Ex. 5c | 16.5 parts | 22 parts |
| Set-to-touch (room temp.) | 150 min | 200 min |
| Tack-free (room temp.) | 240 min | 360 min |
| Pendulum hardness after 24 h | 90 s | 30 s |
| Pendulum hardness after 7 d | 170 s | 57 s |
| Film haze after | 2 h | 2.5 h |
| Water resistance after 24 h of storage | 1 | 0–1 |
| Wet film adhesion after 500 h of tropical test | cc 1 | cc 1 |
| Erichsen deep drawing after 1 week | 9 mm | 10 mm |
| Erichsen deep drawing after 4 weeks | 7 mm | 10 mm |

|  | Dispersion acc. to the invention Example II.8 | Dispersion acc. to German patent 3643751 |
| --- | --- | --- |
| Dispersion | 100 parts | 100 parts |
| Hardener according to European patent 0 000 605; Ex. 5c | 20 parts | 20 parts |
| Set-to-touch (room temp.) | 200 min | 45 min |
| Tack-free (room temp.) | 360 min | 110 min |
| Pendulum hardness after 24 h | 25 s | 75 s |
| Pendulum hardness after 7 d | 48 s | 145 s |
| Film haze after | 2.5 h | 3.5 h |
| Water resistance after 24 h of storage | 0–1 | 1 |
| Wet film adhesion after 500 h of tropical test | cc 1 | cc 4 |
| Erichsen deep drawing after 1 week | 10 mm | 3 mm |
| Erichsen deep drawing after 4 weeks | 9 mm | 1 mm |

Explanation of the test conditions:

1. Set-to-touch: Glass beads strewn over the film can no longer be removed with a paintbrush after hardening.

2. Tack-free: The glass beads can be removed with a paintbrush after hardening.

3. König pendulum hardness: DIN 53 157.

4. Film haze: After hardener and dispersion have been films with a wet film thickness of 200 μm are drawn every half an hour. The appearance of a haze in the film after hardening indicates the end of the processing time and is recorded as the test result.

5. Water resistance after 24 h of storage at room temperature: Films with a wet film thickness of 200 μm, drawn over glass plates, are tested after 24 h of storage in water at room temperature. The evaluation scale ranges from 1=very good to 5=poor.

6. Wet film adhesion: Enamel lacquers are sprayed on to pickled iron sheet to give a dry film thickness of approx. 50 to 60 μm. After drying for seven days, the coated sheets are subjected to a tropical test (40° C., 100% relative humidity). After 500 hours of stressing, the sheets are removed and stored at room temperature for 2 hours, after which the adhesion is measured by the cross-cut test (ISO 2409).

7. Determination of the elasticity according to DIN ISO 1520, "Erichsen deep drawing": The coated sheets are examined in an Erichsen deep-drawing tester after drying for 7 and 14 days and for 4 weeks. The deep drawing is stopped when the surface of the lacquer shows the first crack or the film becomes detached from the substrate. The deep-drawing value is given in mm.

What is claimed is:

1. A process for the preparation of aqueous epoxy resin dispersions comprising
    (1) 20 to 75% by weight, based on the total dispersion, of an epoxy resin constituting a condensation product of
        a) 50 to 95% by weight of one or more epoxy compounds having an average of at least one, preferably at least two epoxy groups per molecule and an epoxide equivalent weight of 90 to 3000 g/mol, and
        b) 5 to 50% by weight of an aromatic polyol;
    (2) 3 to 20% weight, based on the total dispersion, of an emulsifier comprising
        a) 20 to 100% by weight of a condensation product of an aliphatic polyol having an average molecular weight (Mw) of 200 to 20,000 g/mol, and an epoxy compound having at least two epoxy groups per molecule and an epoxide equivalent weight of 90 to 3000 g/mol, the equivalent ratio of the OH groups to the epoxy groups being 1:0.85 to 1:1.5 and the epoxide equivalent weight of this condensation product being between 5000 and 400,000 g/mol,
        b) up to 50% by weight of an organic solvent, and
        c) up to 80% by weight of water;
    (3) up to 10% by weight, based on the total dispersion, of organic solvents, including solvents corresponding to (2)b) which may be present; and
    (4) water in an amount to make up to 100% by weight,
which comprises stirring the epoxy resin (1) firstly with the emulsifier (2) and, if appropriate, organic solvents corresponding to (3), and then with water.

2. The process as claimed in claim 1, wherein conventional additives, hardeners and/or hardenable resins are also added to the dispersions.

3. The process as claimed in claim 1, wherein the dispersant is added at 60° to 200° C.

4. The process as claimed in claim 1, wherein the water is added at 30° to 100° C.

5. The process as claimed in claim 1, which is carried out in the presence of glycols, mono- and/or diethers and -esters of glycols with alcohols and acids, aliphatic alcohols with branched or unbranched alkyl radicals having 1 to 12 carbon atoms, cycloaliphatic and araliphatic alcohols, esters, ketones and aromatic solvents, individually or in a mixture, as organic solvents.

6. The process as claimed in claim 1, which is carried out with a solution of the dispersant (2) in an aqueous medium composed of up to 80%, preferably 15 to 60% of water and up to 50%, preferably up to 30% of a glycol, a mono- and/or diether and -ester of glycols with alcohols and acids, an aliphatic alcohol with branched or unbranched alkyl radicals having 1 to 12 carbon atoms, a cycloaliphatic or araliphatic alcohol or an ester and ketone, or mixtures thereof, as organic solvents.

7. The process as claimed in claim 1, wherein a dispersion with a total water content of 20 to 80% by weight is prepared.

8. The process as claimed in claim 1, wherein a dispersion containing a total amount of organic solvents of up to 10% by weight is prepared.

9. The process as claimed in claim 1, wherein the amount of emulsifier (2) is 4 to 15% by weight, based on the total dispersion.

10. An aqueous epoxy resin dispersion prepared as claimed in claim 1.

11. An epoxy resin dispersion prepared as claimed in claim 1, which additionally contains conventional additives, hardeners and/or hardenable resins.

12. Method of using the epoxy resin dispersion as claimed in claim 1 for the preparation of coatings, undercoats, painting materials, molding compounds and hardenable compounds.

* * * * *